Oct. 14, 1941.                F. W. LYLE                 2,259,316
                          HIGHWAY RADIO SYSTEM
                           Filed Feb. 23, 1939           2 Sheets-Sheet 1
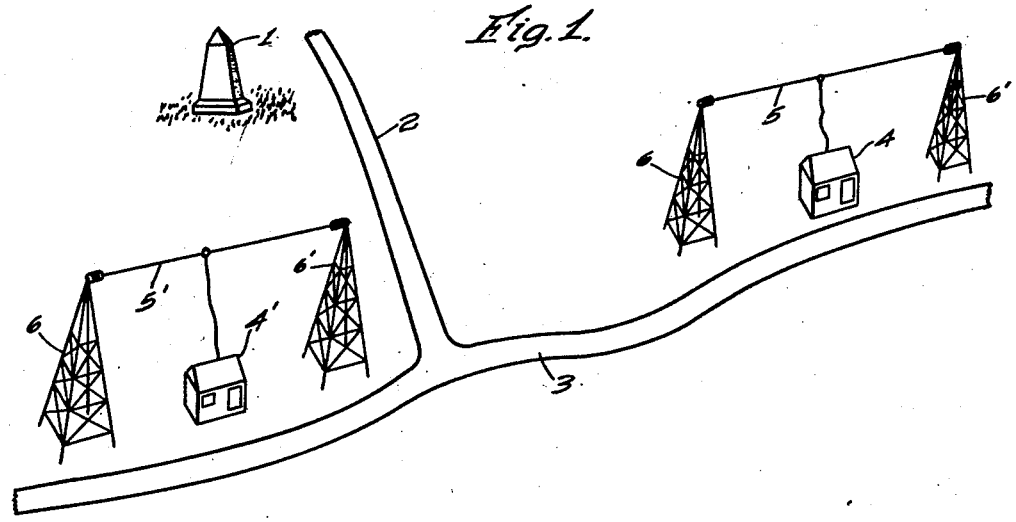
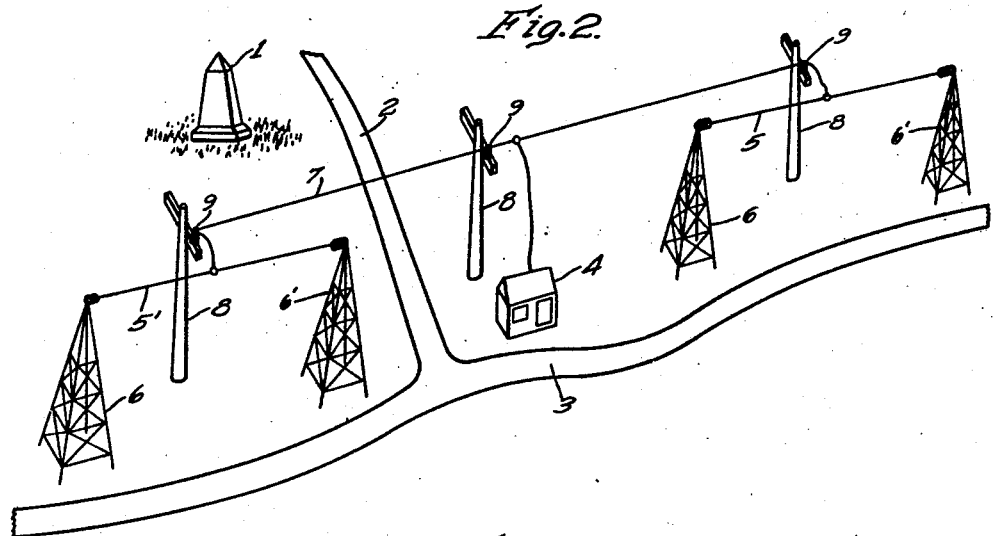
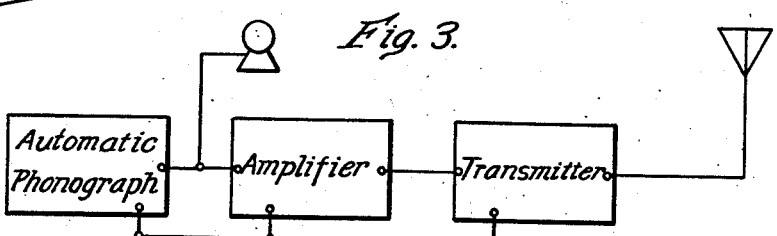
WITNESSES:                                    INVENTOR
                                          Frederick W. Lyle.
                                              BY
                                                   ATTORNEY

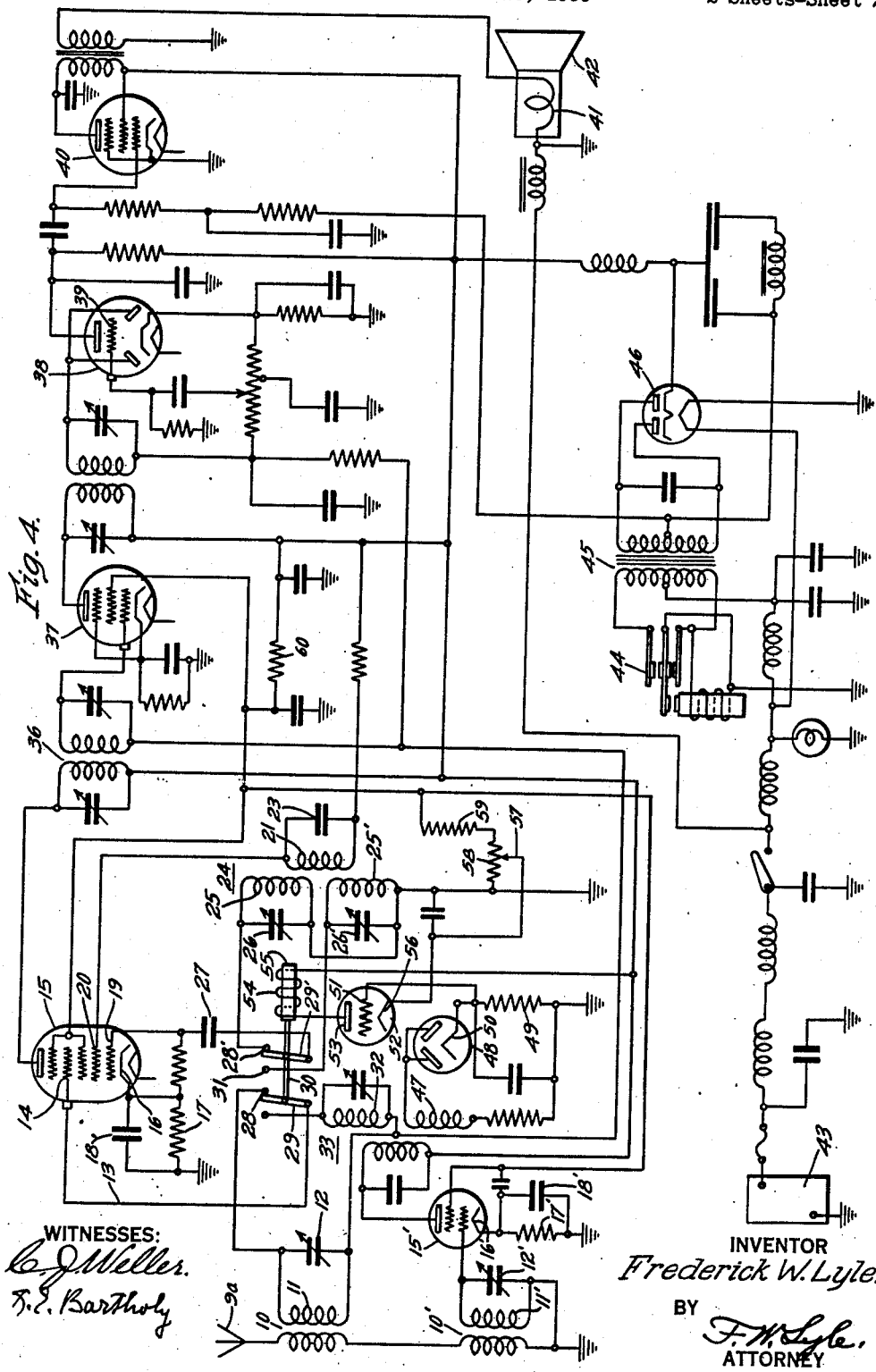

Patented Oct. 14, 1941

2,259,316

UNITED STATES PATENT OFFICE 2,259,316

HIGHWAY RADIO SYSTEM

Frederick W. Lyle, Wilkinsburg, Pa., assignor to Westinghouse Electric & Manufacturing Company, East Pittsburgh, Pa., a corporation of Pennsylvania Application February 23, 1939, Serial No. 257,891

2 Claims. (Cl. 250—6)

This invention relates to radio distribution systems and more particularly to a distribution system of small power covering limited areas and operating automatically to transmit definite messages at repeated intervals.

The extensive use of radio receivers in motor cars permits the realization of the idea underlying this invention which is directed to a convenient distribution of information concerning places of general interest and educational value. There are many places of historic importance which are close to the arteries of motor car traffic. Heretofore, such places were generally identified by large posters or maps, and travel guide books contained the necessary information for the traveler. By these indirect means, only a small percentage of the traveling public could be reached, namely those who happened to notice the signs or who traveled purposely for sightseeing. Places of historical importance have great educational value and it is in the interest of general public enlightenment to convey to all the history or other phases of interest of certain localities.

A universal means for communicating such information is needed not only to explain the history of localities, but it may also advantageously be used to lessen the hazards of automobile traffic by giving warning of dangers lying ahead of the traveler. A communication system of this type may be utilized to give instructions as to speed and, in general, to inform the driver and the occupants of the car of anything which is desirable for them to know, either from a standpoint of general knowledge or safety of travel, law and customs of the place in their immediate vicinity. The system is also applicable to aircraft which are also frequently equipped with radio receivers. In such a special receiver to transmit the messages to the passengers may be provided as distinct from the radio system employed by the pilots in navigating.

A primary object of this invention is to disseminate information to travelers in motor cars equipped with radio receivers by providing a network of broadcasting stations of low power and limited range distributed along motor highways and automatically maintained in operation at definite time intervals.

A further object of this invention is to provide means whereby radio receivers in motor cars while operating on any particular wave length may automatically be tuned to the carrier-frequency of a certain station by the presence of the carrier wave thereof upon entering its radiation field.

Other objects and advantages will be apparent from the following description of the invention, pointed out in particularity by the appended claims, and taken in connection with the accompanying drawings, in which Figure 1 represents a radio distribution system having individual transmitters located along a motor highway.

Fig. 2 represents a system similar to Fig. 1 in which a centrally located transmitter supplies energy to radios along the highway.

Fig. 3 is a block diagram of the transmission system, and

Fig. 4 is a schematic diagram of a receiver for motor cars which may be employed for receiving the signals of the transmitters shown in the preceding figures.

Referring to Figure 1, the arrangement shown therein is to be taken as a schematic representation of a locality situated along a highway having some historical importance, such, for instance, as a battlefield, represented by the monument 1, which may be reached by the side road 2 leading off the highway 3. Along the highway 3 and, in fact, probably a few miles before the monument 1 is reached, may be located a small radio transmitter comprising the transmitting apparatus (not shown) housed in a building 4 with suitable radiating antenna 5 which may be supported by towers 6 and 6'. The operation of this transmitter shall be described later. Suffice it to say that while operating its radiation pattern is to be so calculated as to cover a certain portion of the highway whereby motor cars passing therethrough, if equipped with radio receivers may receive the signals therefrom. This transmitter may be used to convey information to the motorist as to the close proximity of a spot of historic interest or about the condition and peculiarities of the highway in both directions of travel. A second transmitter, similar in arrangement to the one previously described, its main components indicated by identical reference characters bearing primary indices, may be located at a suitable distance from the one formerly described following also the main highway 3. The second transmitter covers an additional area to the one covered by the first transmitter, its radiator being so arranged that no interference in the radiation pattern of the two antennae shall be had. The distance between the two transmitters depends largely upon the topography of the terrain which they serve and should prefereably be so allocated that in leaving the boundary of one and approaching that of the other, the change-over shall not be observed by the listener. The second transmitter may give the general information about the locality and will include a short sketch of the history of the place which is commemorated by the monument 1.

Referring to Fig. 2, the purpose and utility of the arrangement will be the same as that of Fig. 1. The difference between the two resides in that only a single transmitter is utilized which can be modulated at various intervals of time by a different set of prearranged programs taken from conventional transcribed recordings. The radiating antennae 5 and 5' may be widely separated in distance, a transmission line 7 being utilized to feed the two antennae. As shown in Fig. 2, the transmission line 7 is, by way of example, carried by poles 8 and insulators 9. Other types of transmission lines, such as coaxial cables, preferably underground, may as well be used.

In Fig. 3, a block diagram of the transmission system is shown. The various technical aspects of the transmitter and associated components need not be described in detail, inasmuch as any existing and commercially used apparatus will be satisfactory. It is a matter of engineering choice and skill to design a suitable transmitter and amplifier for any particular locality, in order to assure a desired radiation and determine the useful power necessary for its efficient coverage. The power supply may be of batteries, if commercial power is not available and the information to be transmitted can be recorded on phonograph records or any other suitable means of recording which may be played by an automatic device of any well known type. The entire system may be made to operate automatically by connecting time operated switches to start the system and to repeat the complete cycle of its operation at intervals. A microphone may also be connected to the input of the amplifier and at times when seasonable demands of traffic or conditions of emergency arise, this may be used for special announcements.

Referring to Fig. 4, the receiving system schematically shown therein in accordance with this invention is intended for use in motor cars for the reception of broadcast signals as well as signals of such stations which may be located along the highways for the purpose aforestated. Radio receivers of this type may be constructed along conventional lines, the so-called superheterodyne type receivers being preferred. In order that attention of the motorist should be directed toward the special broadcasting stations, which the motor car passes along the highway, an automatic tuning system is included in the receiver circuit, the operation of which is controlled by the carrier frequency energy of the transmitter. The receiver shown in Fig. 4 comprises an input circuit which includes the antenna 9a, coupling transformer 10 for the main broadcast range of the equipment, the secondary 11 of which is tuned by the condenser 12 and energizes through conductor 13 the grid 14 of the dual purpose tube 15. The cathode 16 thereof is grounded through resistor 17 suitably by-passed by condenser 18. Between electrodes 19 and 20, there is an oscillating circuit comprising the inductance of the winding 21 tuned by a capacity 23 forming the primary of a transformer 24. The latter has two secondary windings 25 and 25' each tuned by a condenser 26 and 26', respectively. The secondary winding 25 is connected through coupling condenser 27 to the grid electrode 19 when the contact 28 and arm 29 of a switch 30 is in one position and in the other position through contact 31 with the secondary winding 25'. The input circuit to the amplifier portion of the tube 15 comprising the grid electrode 14 is similarly connected in one position of the switch-arm 29' and contact 28', with the secondary 11 of the input transformer 10. In the other position the connection is completed through contact 28 of the switch 30 with the secondary 32 of the transformer 33. The output circuit of the amplifier portion of the tube 15 terminates conventionally in the intermediate frequency amplifying coupling device such as transformer 36, followed by amplifier tube 37 similarly coupled to the detector tube 38. The local oscillations generated between grids 19 and 20 of the tube 15 are impressed electronically within the tube to the output circuit thereof and the difference frequency to which the transformer 36 is tuned is subjected to further amplification and detection. This is in accordance with conventional superheterodyne type of operation and need not be discussed in great detail. The resultant audio frequency is impressed upon the grid 39 of the tube 38 to be amplified further by the last audio frequency stage comprising output tube 40. From there it is applied to the voice coil 41 of the loud speaker 42.

The power supply is arranged for battery operation and derives its energy from the car battery 43 through suitable radio frequency chokes. It also energizes the heaters of the various tubes together with a vibrator 44 which, in connection with a transformer 45, converts the low voltage direct current power into a high-voltage alternating current which upon being rectified by the tube 46, is suitably filtered, and distributed as high voltage direct current for the energization of the various tubes.

The condensers 12 and 26 are the main tuning condensers of the receiver whereby the entire broadcast band may be covered. The second input circuit comprising the input transformer 10', the secondary winding 11' of which is tuned by a condenser 12', is preadjusted to the allocated frequency of the broadcasting stations serving the highways in accordance with this invention. In order that no interference shall result between the highway transmitters and the various commercial broadcasting stations, this frequency is preferably so chosen as to be outside of the regular broadcast band and may be in the short or ultra short wave spectrum. Whatever frequency may be chosen for best operation, the input circuit to the amplifier tube 15' is designed to respond sharply to this frequency. Tube 15' is connected as an amplifier similarly as tube 15 except that no local oscillations need to be generated thereby. Its cathode 16' is connected through bias resistance 17', by-passed by condenser 18' to ground. The output circuit of tube 15' terminates in the primary winding of transformer 33, being also coupled to an auxiliary winding 47 which is connected through a diode rectifier tube 48 and resistance 49 to ground. The cathode 50 of the tube 48 is connected to the grid 51 of control tube 52, the anode 53 thereof being connected in series with winding 54 of the relay 55 and the high potential side of the filtered power supply. The relay 55 actuates the arms of the switch 30. The cathode 56 of the control tube 52 is connected to the movable arm 57 of a potentiometer 58, which through resistors 59 and 60 forms a voltage divider between ground and the high potential side of the power supply.

Referring to the operation of the receiving system, when the switch 30 is in the position shown, the secondary winding 11 is connected to the grid 14 of the tube 15 and the oscillatory circuit between grids 19 and 20 is determined by windings 21 and 25 of the transformer 24 whereby the receiver is set to normal broadcast band operation. Under such conditions when the antenna 9a is energized only by broadcast frequencies, there is practically no input to the grid of the tube 15', the input circuit comprising inductance 11' and capacitor 12' being resonant to a frequency outside of the broadcast range. There being no input, the tube 15' is in a static condition and its output circuit is not energized. Under such condition, the tube 15' has no amplified signal output and hence there is no voltage impressed upon the winding 47 to be rectified by the tube 48. Consequently, no voltage appears across resistor 49 and the grid 51 of the tube 52 is at ground potential with respect to its cathode 56. The latter is positively biased with respect to ground from the potentiometer 58 to the extent of plate current cut-off and no current flows in the relay winding 54. Now, if the antenna 9a is moved within carrier frequency energy radiation of the transmitters located along the highway, the tuned circuit formed by the secondary 11' and the condenser 12' will become responsive to the particular frequency which is then amplified by the tube 15'. The output circuit thereof will have a radio frequency voltage of sufficient magnitude to energize the winding 47 causing the rectifier to conduct current through the resistor 49 and thereby impress a positive bias with respect to ground on the grid 51. This bias will counteract the cathode bias derived from the potentiometer 58, as stated before, causing plate current flow in the tube 52, which will energize the relay winding 54. This, in turn, actuates the switch 30 and keeps it in the second position as long as plate current is drawn by the tube 52, or in other words, as long as there is carrier frequency input to the tube 15'.

In the second position of the switch 30, the arm 29 closes with contact 28 and the grid circuit of the radio frequency amplifier tube 15 is established through the winding 32 of the transformer 33 which is tuned to the frequency of the highway transmitter. Similarly, the oscillator circuit is changed, the oscillator grid 19 being switched by the arm 29' to contact 31, thereby being connected with the winding 25'. The latter is pretuned by the condenser 26' to generate a local oscillation of such frequency which, when mixed with the frequency of the incoming signal, namely, the frequency of the highway transmitter, will produce the same difference frequency as before when the receiver was operating in the broadcast band. The difference frequency, generally referred to as the intermediate frequency, is further amplified by the tube 37 and conducted to the detector 38. The operation of the rest of the receiver remains the same as previously described in connection with broadcast reception.

The operation of the switching system from broadcast band to the special predetermined frequency of the highway transmitter is entirely automatic and occurs as soon as the antenna 9a is subjected to the electro-magnetic radiation of these special transmitters. The radio frequency energy of these transmitters maintains the changeover switch 30 in the position of reception of highway transmitter signals as long as the car is within the radiation sphere thereof. As the car leaves the radiation field, current in the antenna 9a diminishes until the point is reached when the signals are too feeble to energize the tube 15' sufficiently for the rectifier 43 to develop the necessary bias voltage for the operation of the control tube 52. When plate current ceases in the latter, the relay 54 is deenergized, the switch 30 returns to its original position, and broadcast reception is automatically resumed at the frequency in which position the tuning condensers 12 and 26 were left.

Automatic operation as described has the advantage that travelers need not tune their receivers to special broadcast and shall receive all such broadcasts without any attention being required on their part. This facilitates and assures the reception of important announcements which may be made regarding safety of travel, especially when a case of emergency arises of which motorists are to be warned in due time.

I claim as my invention:

1. In a distribution system for public education, radio transmitting arrangements of low power located along the highways contiguous to places of general interest, said transmitters having radiating antennae so arranged as to be effective for radio frequency power distribution along limited distances to be intercepted by receivers of motor vehicles frequenting said highways, means to cause said transmitting arrangements to broadcast historical information relating substantially exclusively to said contiguous places and means responsive to the wave-length of the station nearest each automobile associated with said receivers for adjusting the tuning thereof to the frequency of said transmitting arrangements.

2. In a distribution system for public education, radio transmitting arrangements of low power located along the highways contiguous to places of historical interest, said transmitters radiating historical information relating substantially entirely to said contiguous places for limited distances only therefrom to be intercepted by receivers of motor vehicles frequenting said highways, and means associated with said receivers and responsive to the frequency and power of said stations for automatically adjusting the tuning of said receivers to the frequency of said station.

FREDERICK W. LYLE.